Oct. 27, 1936.  A. W. ANDERSON  2,058,655

FRICTION CLUTCH

Filed Oct. 12, 1934

Inventor:
Arthur W. Anderson
By: Wm O. Belt
Atty.

Patented Oct. 27, 1936

2,058,655

UNITED STATES PATENT OFFICE 2,058,655

FRICTION CLUTCH

Arthur W. Anderson, Chicago, Ill., assignor, by mesne assignments, to Borg-Warner Corporation, Chicago, Ill., a corporation of Illinois Application October 12, 1934, Serial No. 748,060

5 Claims. (Cl. 192—107)

This invention relates to friction clutches for automotive vehicles and it may also be used in other friction clutches for which it is or may be adapted.

Clutch plates have heretofore been made in various forms but they usually comprise a metal disc which is made fast to the driven member and friction facings which are secured on opposite sides of the disc at and adjacent the periphery thereof and adapted to be located between the clamping parts of the driving member.

The primary object of the invention is to provide for a multi-stage engagement, as distinguished from a continuous progressive engagement, of the friction facings with the clamping parts of the driving member to cause the clutch to take hold easily and smoothly without shock or jar and to eliminate chatter in the clutch.

Another object is to provide clutch facings in sections separately and yieldingly in different planes so as to provide stage engagement of the facings with the driving member of a clutch.

Another object is to provide a facing on each side of the disc of the clutch in a plurality of concentric rings and to mount the rings of each facing for successive stage engagement and the opposite rings of both facings for simultaneous engagement.

And a further object is to provide a novel clutch plate having the friction facings yieldingly mounted thereon with each facing made in concentric rings and the rings of one facing disposed opposite the rings of the other facing and the inner rings mounted more yieldingly than the outer rings to provide a stage operating cushion for the facings and a stage engagement of the facings.

In the accompanying drawing I have shown the invention embodied in one type of clutch plate and referring thereto Fig. 1 is a plan view of the clutch plate;

Figure 1:
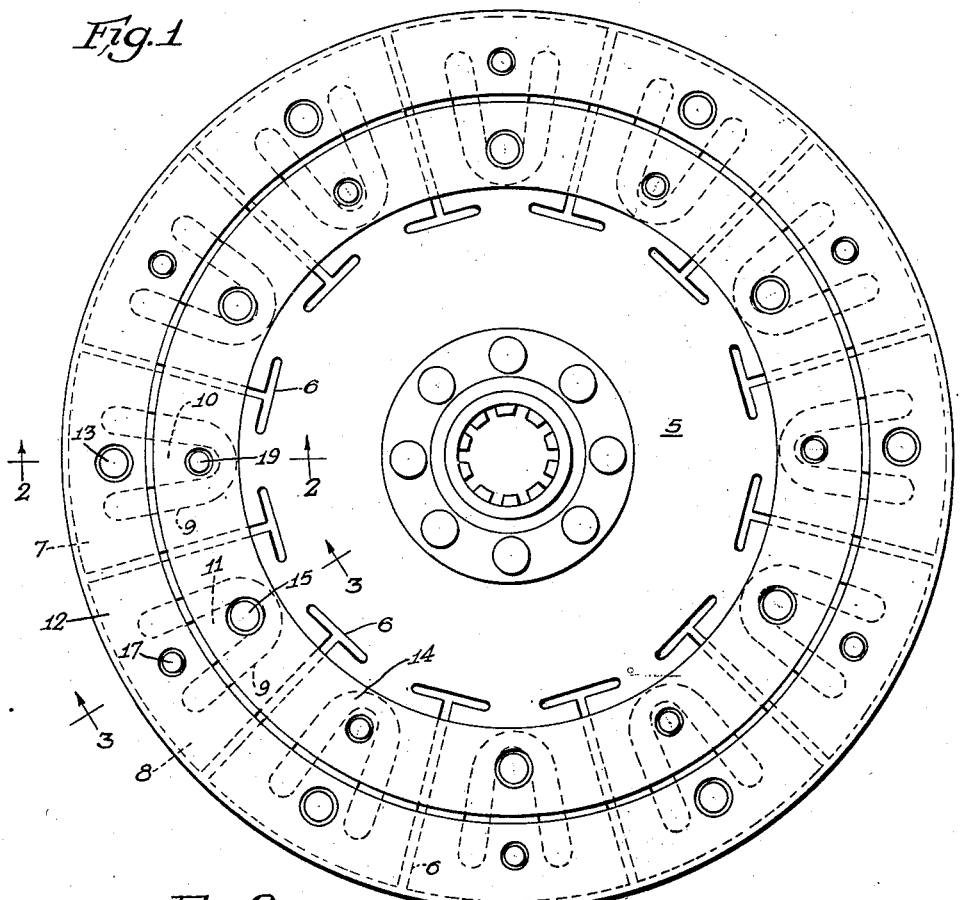
Figure 2:
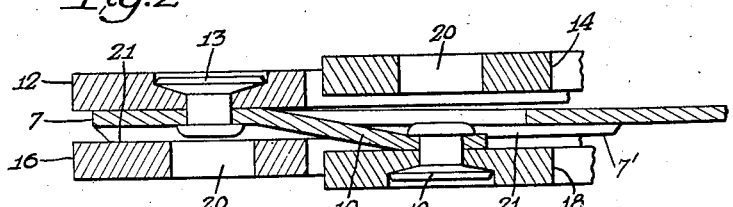
Fig. 2 is an enlarged sectional view on the line 2—2 of Fig. 1.
Figure 3:
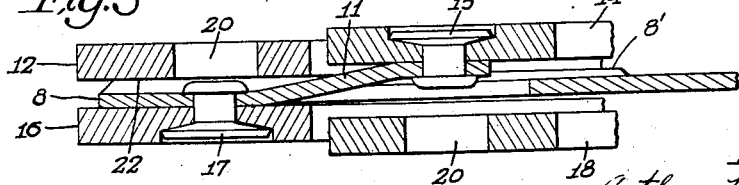
Fig. 3 is an enlarged sectional view on the line 3—3 of Fig. 1.
Figure 4:
Fig. 4 is a fragmentary outer edge view of the clutch plate.

Referring to the drawing the type of clutch plate therein shown comprises a disc 5 having its peripheral portion divided into sectors by T-shaped slots 6 extending radially from the periphery of the disc. Alternate sectors 7 are bent or bowed transversely to one side of the disc and the other sectors 8 are bent or bowed transversely to the other side of the disc. Inwardly directed tongues are formed in each of the sectors by U-shaped cut-outs 9 therein and the tongues 10 are bent laterally on the convex side of the sectors 7, and the tongues 11 are bent laterally on the convex side of the sectors 8. The outer end portions of the tongues are bent to extend laterally beyond the side edges 7', 8' of their respective sectors.

The facings are made in sections in the form of concentric rings and the rings of each facing are oppositely disposed on opposite sides of the disc. In the type of clutch plate illustrated I have shown each facing composed of two concentric ring sections supported in different but parallel planes, one of said sections operating independently of and conjointly with the other section. The outer rings 12 of one facing are secured by rivets 13 to the sectors 7 and the inner rings 14 of this facing are secured by rivets 15 to the tongues 11 of the other sectors 8. The outer rings 16 of the other facing are secured by rivets 17 to the sectors 8 and the inner rings 18 of this facing are secured by rivets 19 to the tongues 10 of the sectors 7. Openings 20 are provided in the rings to receive the inner heads of the rivets under compression of the plate. It will be noted that the outer ring of one facing is fastened to alternate sectors and the inner ring of the opposite facing is fastened to the tongues of the same sectors so that these two rings of opposite facings are mounted on the same sectors; and the other two rings are mounted in like manner on the other sectors.

The rivets 13 engage the sectors midway between their side edges 21 and since the sectors are bowed transversely the side edges lie normally in a plane at one side of the plane of the middle portion of the sectors. Therefore the outer ring 16 normally engages the side edges 21 of the sectors 7 to which the outer ring 12 is fastened and the middle portion of the sectors 8 to which it is fastened; and the ring 12 engages the side edges 22 of the sectors to which the outer ring 16 is fastened and the middle portion of the sectors 7 to which it is fastened. The inner rings 14, 18 are fastened to the tongues 10 and 11 respectively and these tongues are bent to support the rings normally spaced farther apart than the outer rings 12, 16 and clear of the edges of the sectors. During first stage engagement of the clutch the inner rings 14, 18 are moved toward each other until they engage the edges 21, 22 of the sectors and during second stage engagement of the clutch both sets of rings are engaging the edges 21, 22 of the sectors. The yielding cushion supporting the inner rings during the first stage engagement is afforded by the tongues and the yielding cushion for both inner and outer rings is afforded in the second stage engagement by the bowed sectors. Instead of bowing the sectors as shown and described these sectors may be made to function as a cushion by bending them otherwise and causing the facings to engage edge portions instead of the edges only of the sectors, which constructions are known in the art.

The invention provides a multi-stage cushion for the facings and a multi-stage engagement of the facings during engagement of the clutch. During the first stage engagement the inner rings supported entirely by the tongues are compressed, and this is a soft engagement; during the second stage engagement the inner and outer rings are supported by the sectors, and this is a harder engagement.

I may use a metal disc with the tongues formed and bent therefrom as shown and described, and facings of any suitable material secured to the disc by rivets or any other devices suitable for the purpose. I have shown the invention in one type of clutch plate for which it is adapted but I do not intend thereby to limit the invention and I reserve the right to embody it in any and all clutch plates and clutches for which it is or may be adapted within the scope of the following claims.

I claim:

1. A driven clutch plate comprising a disc, friction facings comprising concentric inner and outer flat sections, and cushion means on said disc supporting the sections in different planes on the sides of the disc for full surface contact, the inner sections being spaced apart sufficiently to provide a one stage operation, and the outer sections being spaced closer together for a second stage operation in conjunction with the inner sections.

2. A clutch plate comprising a disc, and friction facings on opposite sides of the disc, each of said facings comprising flat inner and outer annular sections, the inner sections being supported in normal position independently of the outer sections and farther removed from the disc than the outer sections for stage operation of the sections in full surface contact.

3. A clutch plate comprising a disc, friction facings on opposite sides of the disc having their friction faces flat and parallel with one another, each of said facings comprising flat inner and outer annular sections, and cushion means supporting the sections on the disc, one of the sections of each facing being supported farther removed from the disc than the other section of that facing and said farther removed sections being more yieldingly supported than the other sections.

4. A clutch plate comprising a disc, cushion tongues on one side of the disc, and a friction facing comprising two concentric flat rings, one ring being mounted on the tongues and the other ring being mounted on the disc for stage operation of the rings in full surface contact.

5. A clutch plate comprising a driven disc, and a friction facing mounted on one side of the disc, said facing comprising inner and outer separate flat sections of equal thickness throughout mounted for independent and conjoint operation.

ARTHUR W. ANDERSON.